United States Patent Office 3,348,725
Patented Oct. 24, 1967

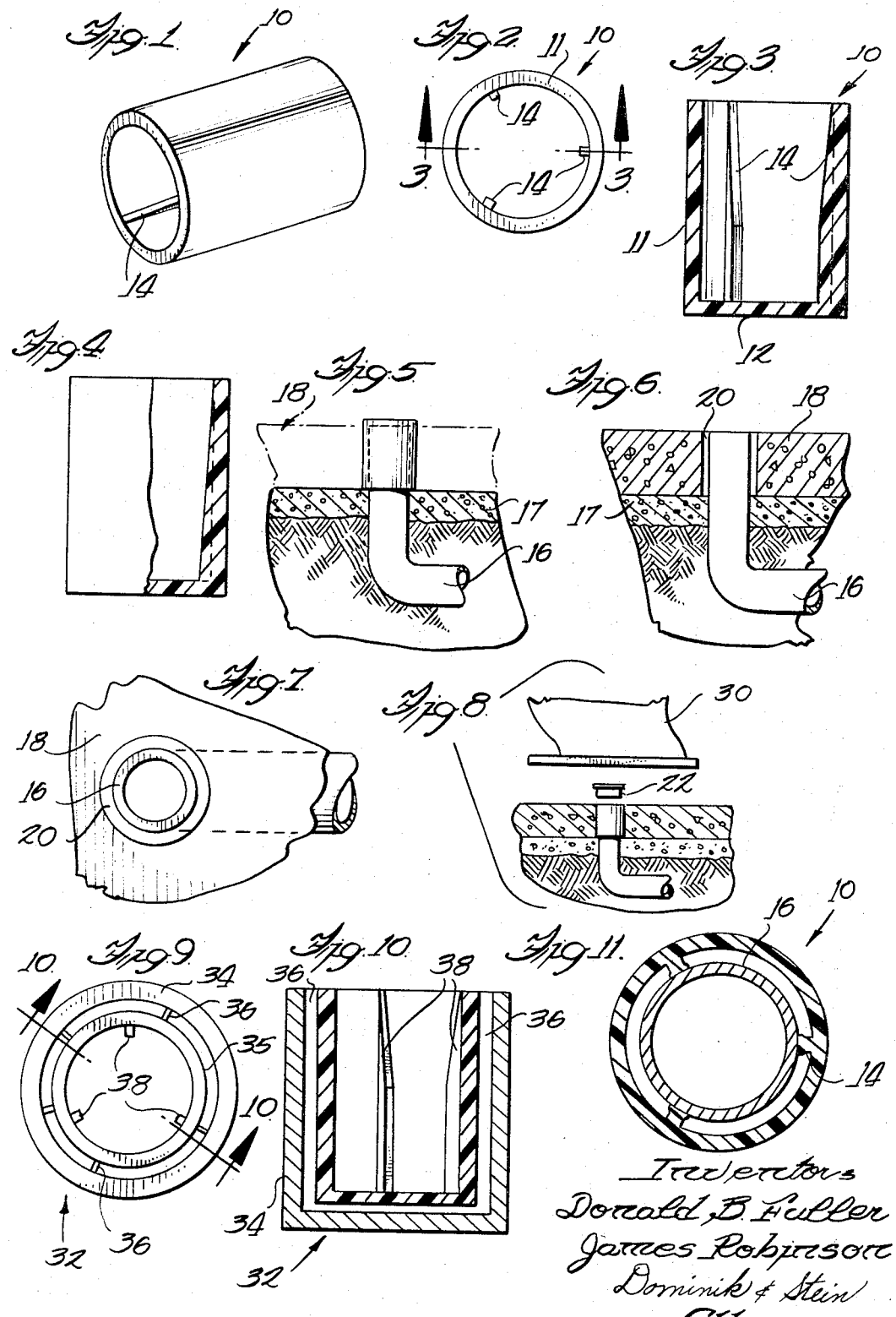

3,348,725
SOIL PIPE COVER
Donald Bedelle Fuller, Champaign, and James Robinson, Homer, Ill., assignors to Kollar Kap Corp., Champaign, Ill., a corporation of Illinois
Filed Oct. 22, 1965, Ser. No. 501,325
8 Claims. (Cl. 220—42)

ABSTRACT OF THE DISCLOSURE

A soil pipe cover fabricated of a foamed plastic preferably polystyrene and having an interior cavity in which there are a number of rib-like tapered spacers for affixing the soil pipe cover to a soil pipe.

---

This invention relates to soil pipe covers for use in installing plumbing fixtures and particularly water closets.

Normally, when constructing a building having a masonry floor, the soil pipe for a water closet is laid so that it protrudes from the masonry floor, and the masonry floor is poured around it. A closet flange is secured to the soil pipe and the water closet is bolted to it. The closet flange is generally inserted in an innerspace provided between the soil pipe and the masonry. In the past, corrugated paper has been wrapped around the end of the soil pipe to form the innerspace to receive the closet flange, but this has not been satisfactory because the paper absorbs a portion of the wet masonry. When the masonry hardens, the saturated paper also hardens and becomes very difficult to remove. In addition, the corrugated paper generally provides only a "roughed-in" innerspace. This, in addition to the fact that the paper absorbs the masonry usually makes it necessary to chip away from the soil pipe sufficient material so that the closet flange can be secured to the soil pipe.

Accordingly, it is an object of the present invention to provide improved soil pipe covers.

It is another object to provide improved soil pipe covers which are effective to maintain a pre-determined space around a soil pipe around which masonry is being poured, and to which is to be attached a water closet. In this respect, it is contemplated that accurate rough-in of the desired innerspace is eliminated, thereby providing a substantial savings in the time required to prepare for pouring the masonry floor.

It is a further object to provide improved soil pipe covers which are simple in construction, inexpensive and easy to install.

It is a further object to provide soil pipe covers which can be used with various sizes of soil pipe.

It is a still further object to provide soil pipe covers which can be removed by heat alone.

It is a still further object to provide improved soil pipe covers which prevent foreign material from entering the soil pipe, thereby eliminating the need for a test plug or the like.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is a perspective view of a soil pipe cover fabricated in accordance with a first embodiment of the invention;

FIG. 2 is a bottom view of the soil pipe cover of FIG. 1;

FIG. 3 is a sectional view taken along lines 3—3 of FIG. 2;

FIG. 4 is a sectional view taken along lines 3—3 of FIG. 2, illustrating an alternative manner of forming the spacers;

FIGS. 5–8 are views illustrating the method of installing the soil pipe cover, and a water closet;

FIGS. 9 and 10 are a top and sectional views, respectively of another soil pipe cover; and FIG. 11 is a bottom view illustrating how the spacers grip a soil pipe to center and to secure the soil pipe cover to it.

Similar reference characters refer to similar parts throughout the several views of the drawings.

Referring now to the drawings, in FIGS. 1–3 there is shown a soil pipe cover 10 constructed in accordance with a first embodiment of the invention. The soil pipe cover 10 is cylindrical in shape having a solid side wall 11 and one closed end 12. Spaced about the side wall 11 on the interior of the soil pipe cover 10 are three ribs or spacers 14 which extend the length of the side wall. The spacers 14 are preferably spaced 120° apart so that they will provide a firm gripping action with a soil pipe when installed, and will provide a self-centering action to the soil pipe cover. The side wall 11 of the soil pipe cover 10 has an inner diameter which is substantially larger than the presently available largest extra heavy weight soil pipe, and the spacers 14 are formed to provide a maximum inner diameter which is slightly less than the outer diameter of standard service weight soil pipes. The spacers 14 can be tapered along their entire length from the bottom wall 12 to the edge of the side wall 11 at its open end, as illustrated in FIG. 4, however, the taper preferably extends only approximately one-half their length, as illustrated in FIG. 2. When fashioned in the preferred manner, it is found that a better centering action, and a more secure fit on the smaller diameter or service weight soil pipes, is provided, when the soil pipe cover is installed in the manner described below.

The soil pipe cover 10 is fabricated of an expandable or foamed plastic such as expandable polystyrene which is non-absorbent, non-porous and fusible so that it will not absorb the freshly poured masonry and can be easily removed by simply heating it. Generally, a temperature of 200–400° C. is sufficient for this purpose. Also, when fabricated of a material of this type the soil pipe covers can be molded easily and inexpensively.

Referring now to FIGS. 5–8, the manner in which the soil pipe cover 10 is installed on a soil pipe 16 prior to pouring a masonry floor 18 and its advantages are illustrated. As can be seen in FIG. 5, the soil pipe 16 extends through and some distance above a sand base 17 upon which the masonry floor 18 is to be poured. The soil pipe cover 10 is installed with its open end downward over the open end of the soil pipe 16. The taper on the spacers 14 will center the soil pipe cover, and by exerting a force on the closed end of the soil pipe cover it is forced downwardly over the end of the soil pipe until its lower edge rests on the sand base 17. If the soil pipe is of the smaller service weight type, the spacers 12 will give and will grip the soil pipe 16 as the soil pipe cover is forced downwardly over it. If the soil pipe 16 is of a larger diameter, the spacers 12 will give or tear away, but will still provide a firm grip with the soil pipe. This action is illustrated in FIG. 11.

The masonry floor 18 is then poured and allowed to harden. The soil pipe cover 10 prevents the masonry from surrounding the soil pipe 16, thereby providing an innerspace 20 (FIG. 7) between it and the masonry floor 18 in which the closet flange 22 (FIG. 8) can seat. It may be noted tha the soil pipe cover will also prevent masonry, or any other foreign matter which may clog the soil pipe 16 from dropping into it. The soil pipe cover 10 can be left on the soil pipe 16 until such time when the water closet is to be installed, and it therefore eleminates the need for a test plug or cover plate which is normally installed for this purpose.

When the water closet is to be installed, the soil pipe cover 10 is removed by melting or burning it with an acetylene or propane torch or the like. It can in this way be removed easily and quickly, with no residue remaining. Alternatively, depending upon the material used, for example, polystyrene, the soil pipe cover 10 can be crushed with a hammer or the like and the pieces removed. Since the soil pipe cover 10 is of a non-absorbent, non-porous material, a clean, uniform innerspace 20 surrounding the soil pipe 16 is provided, as can be best seen in FIGS. 6 and 7, without having to chisel any masonry.

After the soil pipe cover 10 has been removed, the closet flange 22 can be leaded onto the soil pipe 16, and the water closet 30 bolted to it, in the well known manner, to complete the assembly of the respective units, as illustrated in FIG. 8.

In FIGS. 9 and 10 there is illustrated another manner in which a soil pipe cover can be fabricated. The soil pipe cover 32 has an outer wall 34 and a smaller diameter inner wall 35 which are held in spaced relation by means of wall spacers 36. When constructed in this fashion, the walls 34 and 35, and in particular the outer wall 34, must have a sufficient thickness so they are rigid enough to prevent the masonry from collapsing them, or a sufficient number of wall spacers 36 must be provided to give the necessary rigidity. Spacers 38 formed in the manner described above are also spaced about the interior periphery of the soil pipe cover 32.

Soil pipe covers of the type illustrated in FIGS. 1–3 which were fabricated of expandable polystyrene and which were found to function entirely satisfactory to provide the desired innerspace between a soil pipe and a masonry floor had the following dimensions:

| | Inches |
|---|---|
| Overall outside length | 7 |
| Overall inside length | 5 13/16 |
| Outside diameter | 6 |
| Inside diameter (side wall) | 4 13/16 |
| Spacers: | |
| Width | 1/4 |
| Depth | 1/8 |
| Taper length | 3 |

A soil pipe cover with these dimensions would fit all presently available standard sizes of soil pipe, and would provide a uniform diameter innerspace of approximately 3/4 inch between the soil pipe and the masonry floor. Both types were easily removed with the application of heat, to melt them.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A soil pipe cover adapted to be placed over a soil pipe preparatory to pouring a masonry floor and to provide an innerspace between the soil pipe and the masonry floor upon its removal, said soil pipe cover being removable by the application of heat thereto to melt or burn it and comprising a cylindrical container which is formed of a fusible material having a side wall with an exterior diameter of a size sufficient to provide the desired innerspace and an interior diameter which is larger than the outer diameter of available extra heavy weight soil pipe, an end wall at one of its ends and a plurality of spacers spaced longitudinally about the interior periphery of said side wall and having a length corresponding to the interior length of said side wall, each of said spacers being tapered along their entire length and of a depth sufficient to firmly grip the edge of available standard service weight soil pipe when said soil pipe cover is installed over it.

2. A soil pipe cover adapted to be placed over a soil pipe preparatory to pouring a masonry floor and to provide an innerspace between the soil pipe and the masonry floor upon its removal, said soil piper cover being removable by the application of heat thereto to melt or burn it and comprising a cylindrical container which is formed of a fusible plastic material having a side wall with an exterior diameter of a size sufficient to provide the desired innerspace and an interior diameter which is larger than the outer diameter of available extra heavy weight soil pipe, an end wall at one of its ends and at least three spacers equally spaced longitudinally about the interior periphery of said side wall, each of said spacers being tapered along their entire length and of a depth sufficient to firmly grip the edge of available standard service weight soil pipe when said soil pipe cover is installed over it.

3. A soil pipe cover adapted to be placed over a soil pipe preparatory to pouring a masonry floor and to provide an innerspace between the soil pipe and the masonry floor uopn its removal, said soil pipe cover being removable by the application of heat thereto to melt or burn it and comprising a cylindrical container which is formed of a fusible plastic material having an inner and an outer side wall spaced from one another by means of wall spacers therebetween, said outer wall having a diameter of a size sufficient to provide the desired innerspace and said inner wall having an interior diameter which is larger than the outer diameter of available extra heavy weight soil pipe, an end wall at one of its ends and a plurality of spacers spaced longitudinally about the interior periphery of said inner side wall, each of said spacers being tapered and of a depth sufficient to firmly grip the edge of available standard service weight soil pipe when said soil pipe cover is installed over it.

4. A soil pipe cover adapted to be placed over a soil pipe preparatory to pouring a masonry floor and to provide an innerspace between the soil pipe and the masonry floor upon its removal, said soil pipe cover being removable by the application of heat thereto to melt or burn it and comprising a cylindrical container which is formed of a fusible material having a side wall with an exterior diameter of a size sufficient to provide the desired innerspace and an inner diameter which is larger than the outer diameter of available extra heavy weight soil pipe, an end wall at one of its ends and a plurality of spacers spaced longitudinally about the interior periphery of said side wall and having a length corresponding to the interior length of said side wall, said spacers having a depth such as to provide a maximum interior diameter which is less than the outer diameter of available standard service weight soil pipe, each of said spacers being tapered along approximately one-half its length to a zero taper at the inner edge of the side wall at the open end of the soil pipe cover.

5. A soil pipe cover adapted to be placed over a soil pipe preparatory to pouring a masonry floor and to provide an innerspace between the soil pipe and the masonry floor upon its removal, said soil pipe cover being removable by the application of heat thereto to melt or burn it and comprising a cylindrical container which is formed of a fusible plastic material having an inner and an outer side wall spaced from one another by means of wall spacers therebetween, said outer wall having a diameter of a size sufficient to provide the desired innerspace and said inner wall having an interior diameter which is larger than the outer diameter of available extra heavy weight soil pipe, an end wall at one of its ends and a plurality of spacers spaced longitudinally about the interior periphery of said inner side wall, said spacers having a depth such as to provide a maximum interior diameter which is less than the outer diameter of available standard service weight soil pipe, each of said spacers being tapered along approximately one-half its length to a zero taper at the inner edge of the side wall at the open end of the soil pipe cover.

6. A soil pipe cover adapted to be placed over a soil pipe preparatory to pouring a masonry floor and to provide an innerspace between the soil pipe and the masonry floor upon its removal, said soil pipe cover being removable by the application of heat thereto to melt or burn it and comprising a cylindrical container which is formed of expandable polystyrene having a side wall with an exterior diameter of a size sufficient to provide the desired innerspace and an interior diameter which is larger than the outer diameter of available extra heavy weight soil pipe, an end wall at one of its ends and at least three spacers equally spaced longitudinally about the interior periphery of said side wall, and having a length corresponding to the interior length of said side wall, said spacers having a depth such as to provide a maximum interior diameter which is less than the outer diameter of available standard service weight soil pipe, each of said spacers being tapered along approximately one-half its length to a zero taper at the inner edge of the side wall at the open end of the soil pipe cover.

7. A soil pipe cover adapted to be placed over a soil pipe preparatory to pouring a masonry floor and to provide an innerspace between the soil pipe and the masonry floor upon its removal comprising a cylindrical receptacle closed at one eend thereof and having disposed on its inner surface longitudinal spacers comprising tapered ridges protruding from the inner walls of said receptacle along the length thereof and being tapered along their entire lengths toward the edge of its open end, said receptacle being formed of a foamed plastic material which fuses upon being subjected to heat.

8. A soil pipe cover adapted to be placed over a soil pipe preparatory to pouring a masonry floor and to provide an innerspace between the soil pipe and the masonry floor upon its removal comprising a cylindrical receptacle closed at one end thereof and having disposed on its inner surface longitudinal spacers comprising tapered ridges protruding from the inner walls of said receptacle along the length thereof and being tapered along approximately one-half of their length toward the edge of its open end, said receptacle being formed of a foamed plastic material which fuses upon being subjected to heat.

References Cited

UNITED STATES PATENTS 3,203,577   8/1965   Parker _____ 220—42

THERON E. CONDON, *Primary Examiner.*

J. B. MARBERT, *Assistant Examiner.*